Figure 1:
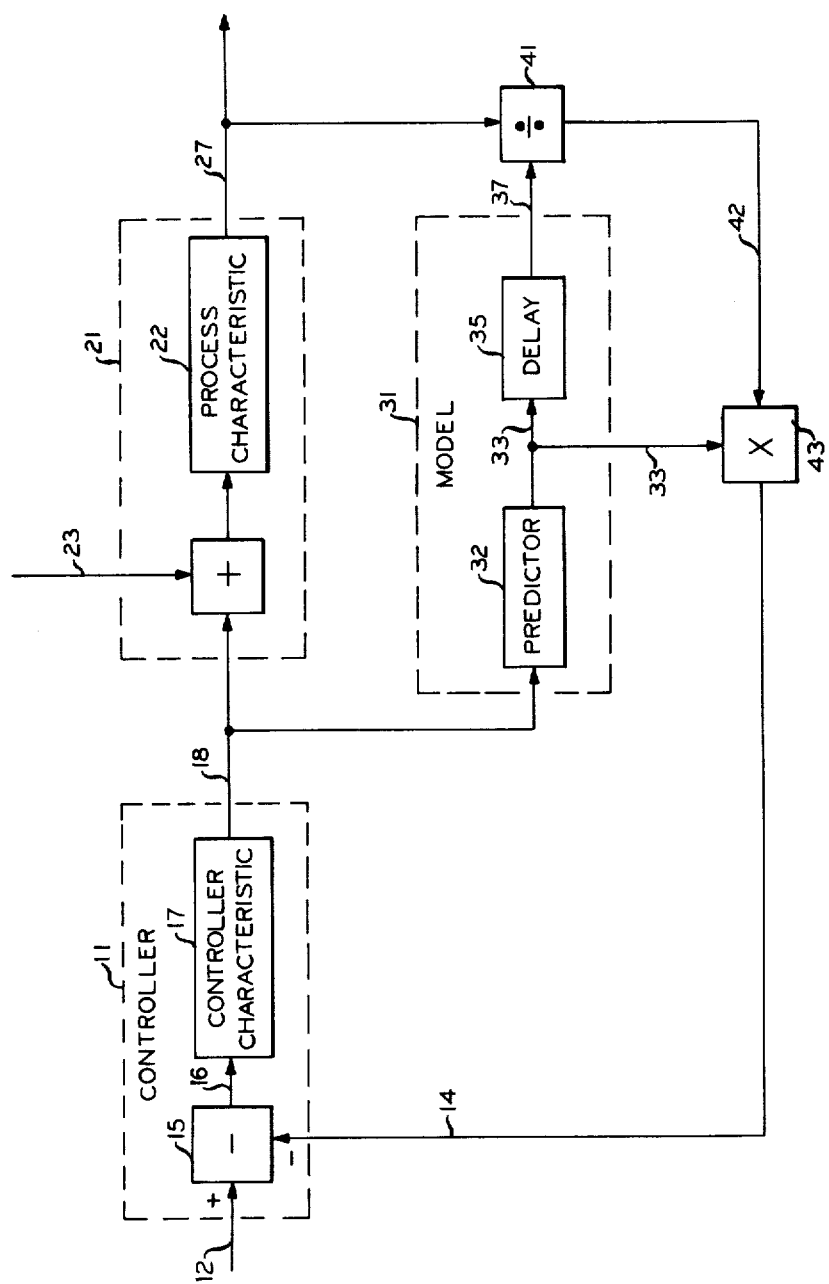

United States Patent [19]

Bartley et al.

[11] 4,054,780

[45] Oct. 18, 1977

[54] GAIN-ADAPTIVE PROCESS CONTROL

[75] Inventors: Thomas M. Bartley, Brownsville, Tex.; Richard F. Giles, Bartlesville, Okla.

[73] Assignee: Phillips Petroleum Company, Bartlesville, Okla.

[21] Appl. No.: 737,374

[22] Filed: Nov. 1, 1976

[51] Int. Cl.² .......................................... G05B 17/00
[52] U.S. Cl. ................................... 364/106; 526/59; 364/118
[58] Field of Search ....................... 235/151.12, 150.1; 526/59

[56] References Cited

U.S. PATENT DOCUMENTS 3,558,045  1/1971  Smith ..................... 235/150.1 X Primary Examiner—Eugene G. Botz

[57] ABSTRACT

In a process control system, a control signal to the process is provided to a process model having a predictive element and a delay element adapted to reproduce as closely as possible the action of the measured process variable to the control signal. The variable input signal to the process controller, upon which generation of the process control signal is based, is generated by multiplying the signal from the predictive portion of the process model by a correction factor generated in response to the ratio of the actual process measurement signal to the delayed model output signal.

18 Claims, 11 Drawing Figures

GAIN-ADAPTIVE PROCESS CONTROL

This invention relates to a method and apparatus for controlling a process. In another aspect the invention relates to a method and apparatus for generating a gain correction factor which can be applied to the output of a process model prediction signal to provide a variable input signal to a process controller. In still another aspect the invention relates to a method and apparatus for providing a control system suitable for use in the control of a process having a variable or nonlinear gain. In still another aspect the invention relates to a control system which permits simplified start-up of the controlled process. In another aspect the invention relates to a control system providing improved response to controller setpoint and process disturbance changes.

The control of processes characterized by time delays or significant amounts of lag which are incurred in the process response to control efforts presents process control problems which are further complicated in many instances by the fact that the process gain is variable or nonlinear over all or a portion of the process operating range. In addition, even when the gain of the process is relatively constant and linear, errors in the selection or tuning of the gain of a process model utilized by a control system can cause difficulty in achieving the desired control of the process, particularly during start-up of a control system prior to being tuned or more closely adapted to the process which it controls.

A control scheme generally referred to as a Smith predictor was developed to provide a means of alleviating the difficulty of controlling processes involving time delays. The Smith predictor technique utilizes the prediction of the measured process output through the use of a process model which does not contain dead time. The output of this predictor element is then delayed with a time-delay element which constitutes a separate model of the process dead time. The delayed predictor output is subtracted from the measured process output and the resulting model "error" signal is added to the current model predictor output to correct for predictor deficiencies. The quality of control achieved with the Smith predictor is, however, sensitive to modeling errors, especially dead time and gain errors. In particular, the Smith predictor technique is not well suited for use with processes having significantly nonlinear or time-varying gains, or for implementations where there may be appreciable error in the gain of the model predictor.

Accordingly, an object of the invention is to provide a method and apparatus for controlling a process. Another object of the invention is to provide a method and apparatus for generating a gain correction factor which can be applied to the output of a process model prediction signal to provide a variable input signal to the process controller. Another object of the invention is to provide a method and apparatus for providing a control system suitable for use in the control of a process having a variable or nonlinear gain. Still another object of the invention is to provide a control system which permits simplified start-up of the controlled process. Another object of the invention is to provide a control system providing improved response to controller setpoint and process disturbance changes.

In accordance with the invention, a control method and apparatus are provided which effectively treat all differences between process and model outputs as being due to gain discrepancies. Although such an assumption is particularly applicable to processes in which there is known fixed process delay due to the operation of a measurement device, such as chromatograph, or the dead-time is known and can be simulated nearly exactly, a control system based on such an assumption also provides improved process control with a process having a variable gain or a non-linear gain. In addition, control systems designed in accordance with the invention provide improved response to controller setpoint and process disturbance variations and also permit more expeditious start-up of the control system since only the process dead-time and process dynamics must be identified prior to start-up.

In the operation of the invention, the process control signal provided by a process controller to the process for control purposes is also provided to a process model means having a predictive model portion which simulates the gain characteristics of the process to produce a process prediction signal representative of the predicted response of a measured process variable to the process control signal. In addition, the process model applies a delay factor, modeled after the response delay of the process, to the process prediction signal in order to produce a delayed prediction signal. A process measurement signal representative of the value of the measured process variable is used in conjunction with the delayed prediction signal to produce a correction signal responsive to the ratio of the measured process variable to the delayed process response prediction. The output signal of the predictive portion of the process model is then multiplied by this correction factor to produce the controller input signal in response to which the process control signal is generated.

Figure 2:
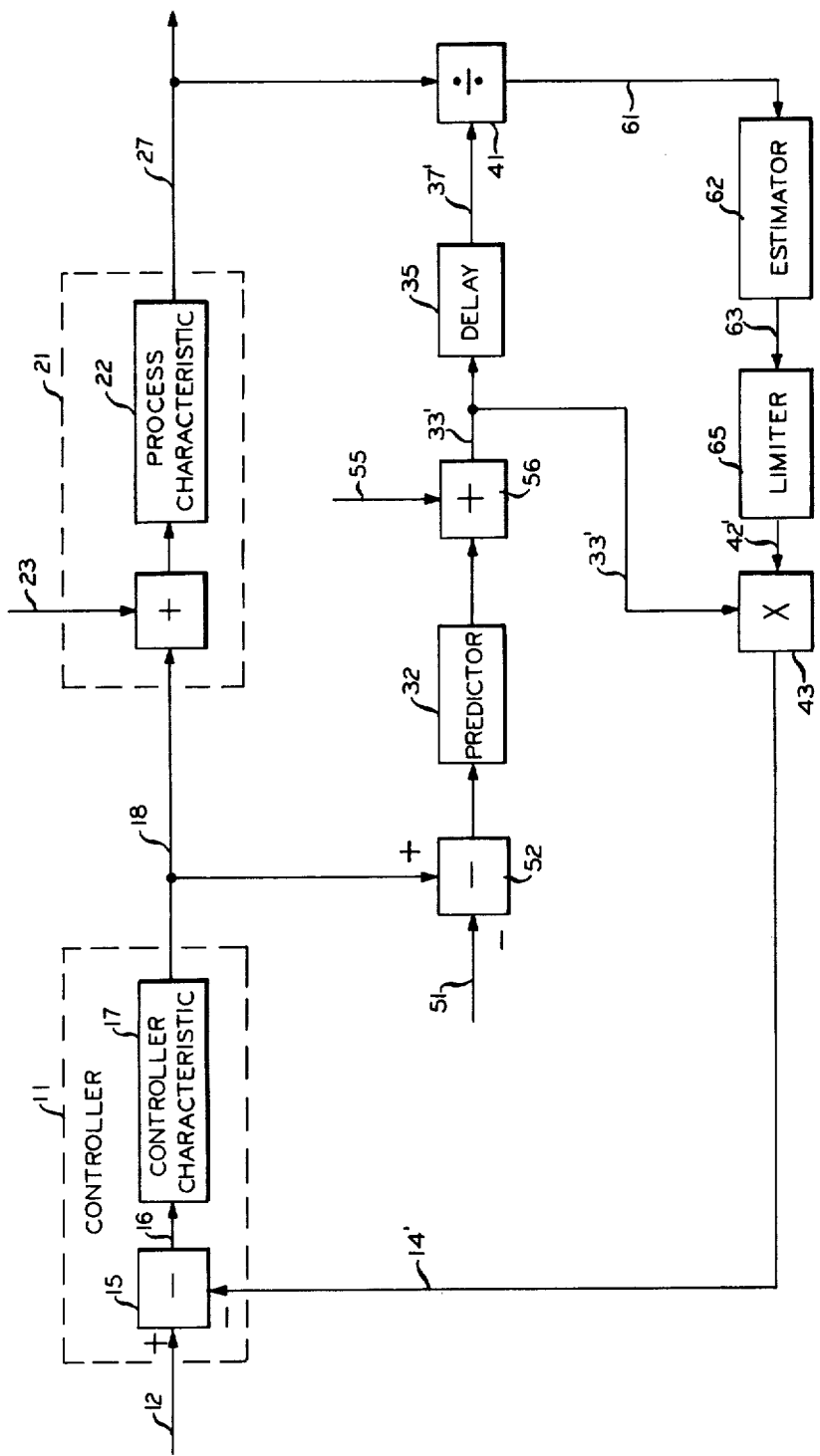

Additional objects and advantages of the invention will be apparent from the appended claims thereto and from the detailed description of the preferred embodiments of the invention illustrated by the drawings in which FIG. 1 is a schematic block diagram of a first preferred method and apparatus of the invention;

FIG. 2 is a schematic block diagram of a second preferred method and apparatus of the invention; and FIGS. 3–11 are graphic representations of the response parameters of control systems constructed in accordance with the invention with FIGS. 3–9 and 11, comparing the response of gain-adaptive control systems implemented in accordance with the invention with the response of comparable Smith predictor control systems.

Referring to FIG. 1, a controller 11 accepts as inputs thereto, a setpoint signal 12 and a process variable signal 14. A subtracting means 15 or other similar suitable comparison means produces, in response to a comparison between the controller variable input signal 14 and the setpoint signal 12, an error signal 16 representative of the extent to which the controller variable input signal 14 differs from the setpoint signal 12. In response to error signal 16, the characteristic response of the particular controller 11 utilized, designated as the controller characteristic 17, produces a process control signal 18 suitable for initiating the desired process response to the error signal 16. While the use of any suitable controller characteristic 17 is within the scope of the invention, one suitable controller characteristic 17 is of the proportional-integral type in which the process control signal 18 fulfills the general condition $$p_c = K_1 E + K_2 \int E\, dt$$

where $P_c$ is the process control signal 18, $K_1$ and $K_2$ are constants, and $E$ is said error signal 16. In a preferred controller embodiment, the error signal 16 can also be expressed as $(SP - V)$ where $SP$ is said setpoint signal 12 and $V$ is said controller variable input signal 14.

The process control signal 18 is provided by appropriate means to control a process 21. The process 21 can be represented generally as a process characteristic 22 embodying both a gain factor or transfer function, as well as a delay or dead-time function. In addition to the steady-state characteristics of the process 21 represented by the process characteristic 22, disturbances or load changes which may occur in the process due to various conditions are represented by a disturbance signal 23 which is, for the purpose of illustration, added to the process control signal 18 to illustrate the impact that various disturbance factors will have on the process. While this characterization of the process 21 has been chosen for the purpose of illustration and analysis, it is, of course, understood that any practical process will exhibit various intermingled gain, delay, and disturbance characteristics which will ultimately determine the value of the measured process parameter. As used herein, the designation process also includes the equipment used to measure the controlled process parameter as well as any transfer characteristic, delay, or disturbance which may be inherent in such measuring and signal generating apparatus. Such measurement apparatus within the process produces a process measurement signal 27 representative of the measured value of the control parameter.

The process control signal 18 is also provided to a process model 31 wherein the characteristics of the process 21 are simulated by means of a predictor 32 which produces a process prediction signal 33 representative of the predicted response of the process measurement signal 27 to the process control signal 18. The predictor means 32 takes into account the gain or transfer function of the process 21, but does not incorporate the delay or dead-time of the process. The process prediction signal 33 is provided to a model delay means 35 which matches, as closely as possible, the delay response of the process characteristic 22 in producing a delayed prediction signal 37. A divider means 41 divides the process measurement signal 27 by the delayed prediction signal 37 to produce a correction signal 42 representative of the ratio of the measured process variable to the delayed process response prediction. A multiplier means 43 thereafter applies the correction signal 42 to the process prediction signal 33 to produce the controller variable input signal 14.

The structure of the gain-adaptive control system of the invention is improved over that of the Smith predictor, with a dividing means 41 replacing a substracting means of the Smith predictor and a multiplying means 43 replacing an adding means of the Smith predictor. For the "ideal" case, in which the predictor-plus-delay model 31 exactly reproduces the process output (ignoring load changes and disturbance factors represented by signal 23 of FIG. 1) the correction signal 42 produced by the dividing means 41 will have a value of 1 and the variable control input signal 14 will be equal to the process prediction signal 33.

In the more realistic case, when the process and model outputs are not identical, the gain-adaptive technique of the invention provides for control of the process using the model predictor 32 in series with the multiplier 43 which acts as a variable gain element with the gain factor applied by the multiplying means 43 being dependent upon the ratio of the process measurement signal to the output of the predictor plus delay model. An attractive feature of this system is the fact that its stability (for a stable process) depends only upon the stability of the adaptive input-shaping filter consisting of the controller 11, model predictor 32, and variable gain or multiplier means 43. Since there is no dead-time involved in the loop incorporating these elements, and since the predictor 32 and controller 11 dynamics are known, the system's stability can be readily investigated using conventional analysis procedures with the gain factor of the multiplying means 43 taken to be a variable parameter. In this sense, the method and apparatus of the invention have an additional advantage in that they provide a system which is well suited for a root-locus analysis with the gain factor of the multiplying means 43 as the variable gain.

While the control system illustrated by FIG. 1 is suitable for many control purposes and is preferred when a more sophisticated system is not required, incorporation of one or more additional features into a control system constructed in accordance with the invention as illustrated by FIG. 2 may be desirable in many applications. In the embodiment of the invention illustrated by FIG. 2, the controller 11 and process 21, as well as all input and output signals associated therewith, are the same as those illustrated by FIG. 1. In addition, the model predictor means 32, model delay means 35, divider means 41, and multiplier means 43 fulfill the same function with respect to the system of FIG. 2 as in the system of FIG. 1. The system of FIG. 2 additionally provides for the use of a perturbation type of model as the model predictor in the compensation scheme by permitting bias signals 51 and 55 to be applied to the input and output respectively of the predictive portion 32 of the process model in order to correct the predictor input and output for the operating point values used in formulating the perturbation model. While the bias signals 51 and 55 are illustrated as being applied to the input and output signals of the predictor 32 by means of a subtracting means 52 and adding means 56, it is, of course, within the scope of the invention to use any suitable means for applying such bias factors when a perturbation model is used to produce a process prediction signal 33'.

The measured process variable signal 27 is divided by the delayed prediction signal 37' by the dividing means 41 to produce a ratio signal 61 from which a correction signal can be generated. The ratio signal 61 is provided to an estimator means 62 which comprises a lead-compensation element which preferably has a lead time constant bearing a desired relationship to the model dead-time. In most applications, it is preferred that the lead-compensation time constant to the estimator 62 be equal to the time constant of the process model dead-time so that the estimator output signal 63 effectively predicts the value of the ratio signal 61 one dead-time length ahead. In this situation the estimator means 62 effectively estimates the current value of the ratio of signal 61 based on the measurement signal 27 incorporating process delay and the delayed prediction signal 37' and thereby provides adaptation of the gain of the predictor means 32 to a "corrected" value based on a comparison (after delay) of model and process outputs.

In discussing the response characteristics of the processes and process models, it is convenient to express the gain and lag characteristics of the process and model in terms of the Laplace transform $S$ domain response to a unit step change. A model delay means 35 suitable for stimulating the dead-time of many processes provides a delay factor of the general form $$, e^{-T_{md}S}$$

where $e$ is the natural or Napierian logarithm base, 2.71828..., and where $T_{md}$ is an $S$ domain time constant. With such a delay factor, an estimator means 62, if used, will preferably apply an estimation factor of the general form $$, 1 + T_{dl}S$$

where $T_{dl}$ is an $S$ domain time constant.

In implementing the gain-adaptive dead-time compensation in accordance with the invention, it may be necessary to limit the permitted range of the correction factor in order to insure system stability. The acceptable limits for any particular process and its associated control system could be determined by means of a stability analysis. The application of such a limitation is illustrated schematically in FIG. 2 by the action of a limiter means 65 on the estimator output signal 63 to generate a correction signal 42'. The limiter means 65 can be any suitable means for applying the desired limits to the signal provided thereto. One such limiting means could be, for example, a half-wave rectifier means used to prevent the occurrence of positive feedback.

While the system illustrated by FIG. 2 includes provision for applying a bias factor to both the input and output of the predictor means 32, for using an estimator means 62 to apply a lead-compensation factor to the output of the dividing means 41, and for using a limiting means 65 to maintain the correction factor signal 42 or 42' applied to the multiplying means 43 within a desired range, these and similar additional features can be used individually or in any desired combination as required to impart the required response characteristics to the control system. For example, the output of the dividing means 41 of FIG. 1 can be applied to the estimator means 62 with the output of the estimator means 62 being applied directly to the multiplying means 43 as a correction factor signal.

EXAMPLES

The comparative responses of the gain-adaptive control system of the invention and a comparable Smith predictor control system were simulated by means of a programmed digital computer assuming a process characteristic which is represented by the second order lag plus dead-time characteristic $$G_p(s) = \frac{K_p e^{-T_d S}}{(T_{p1}S + 1)(T_{p2}S + 1)}$$

with time constants $T_{p1}$ and $T_{p2}$ of 10.0 and 5.0 seconds respectively and a dead-time $T_d$ of 15.0 seconds.

The process model predictive term was of the form $$\frac{K_m}{(T_{m1}S + 1)(T_{m2}S + 1)}$$

with the model dead-time factor being of the form $e^{-T_{md}S}$.

The gain-adaptive control scheme simulated was as illustrated by FIG. 1 with the addition of an estimator between the output of the dividing means 31 and the input of the multiplying means 33. The Smith predictor control scheme simulated was the system of FIG. 1 with a subtraction means being substituted for the dividing means 41 and an addition means being substituted for the multiplication means 43. In each case the estimator function was of the format.

$$, 1 + e^{-T_{dl}S}$$

with the time constant $T_{dl}$ being the same as the lag time $T_{md}$ except for one case as hereinafter indicated.

Figure 3:
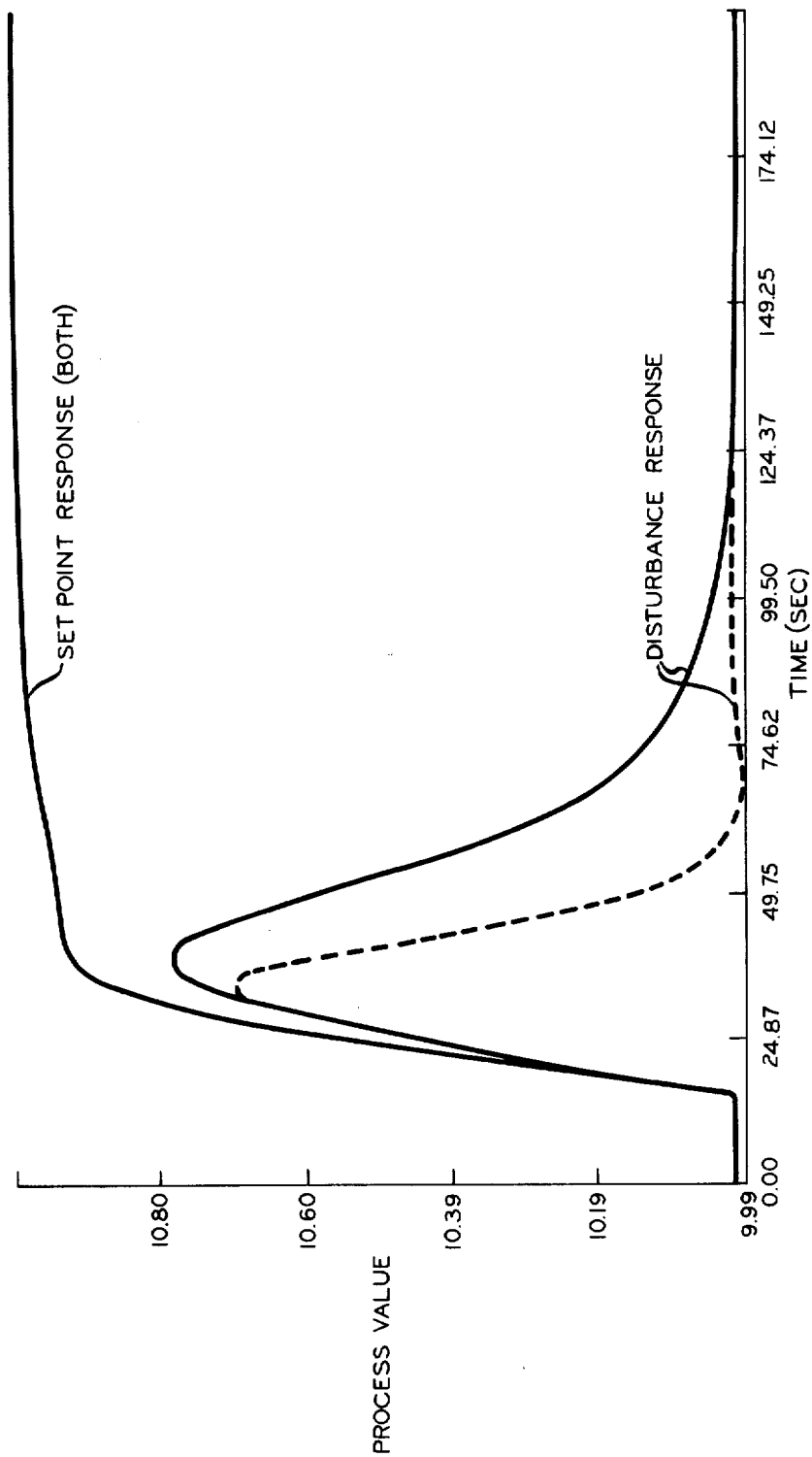

Eight different model error conditions were simulated with the results being illustrated by the FIGS. of the drawing as follows:

FIG. 3 — exact model

Figure 4:
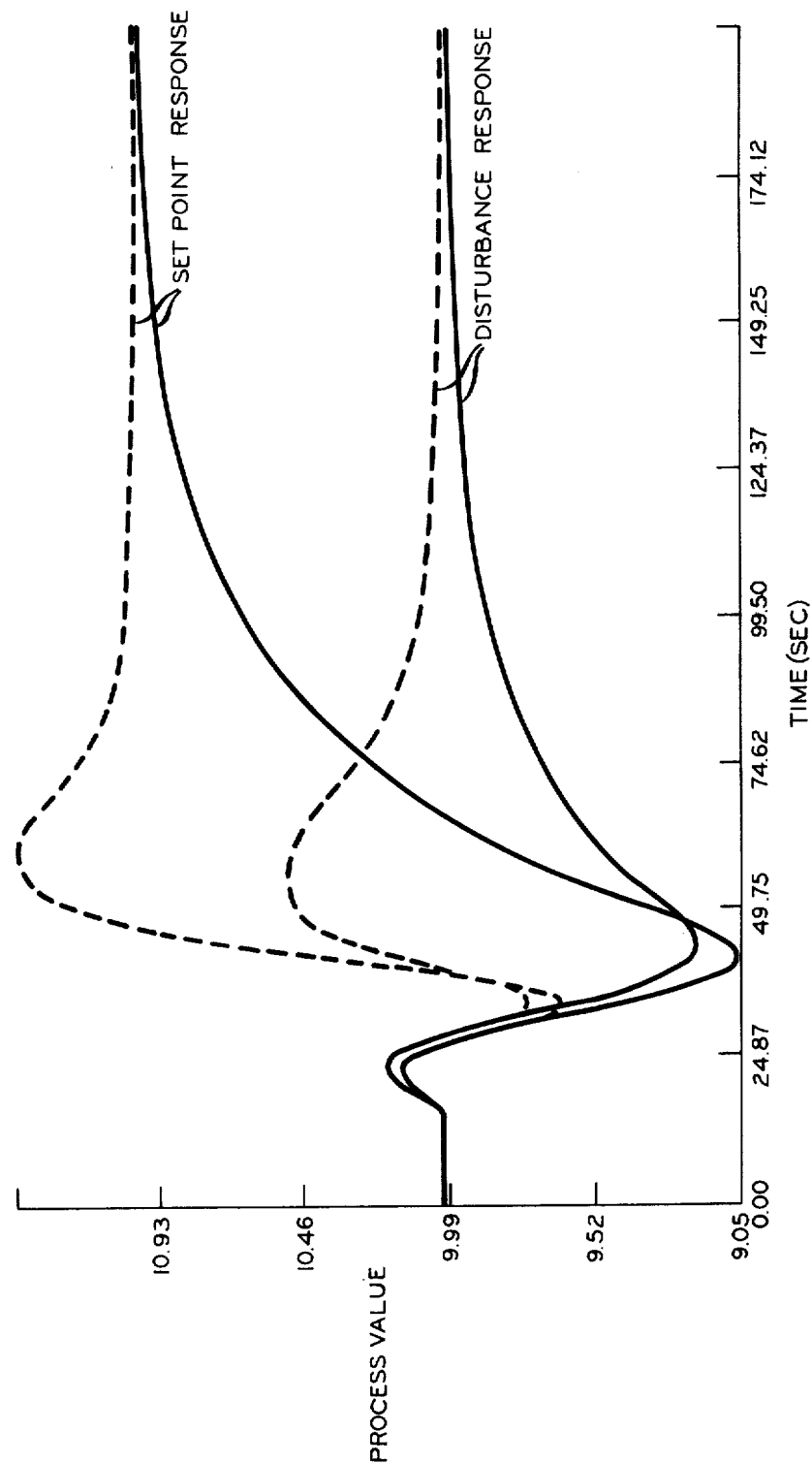

FIG. 4 — model gain greater than process gain

Figure 5:
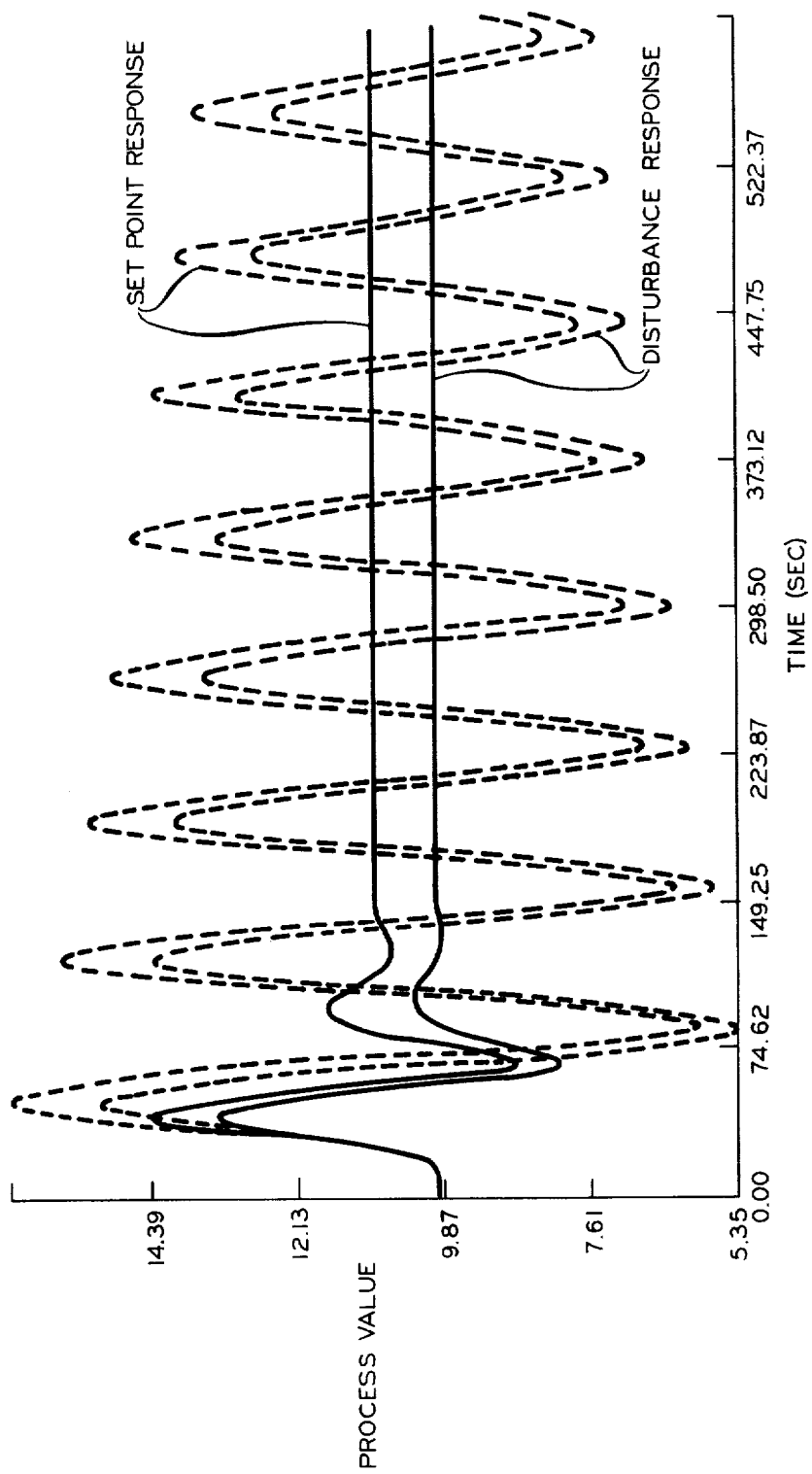

FIG. 5 — model gain less than process gain

Figure 6:
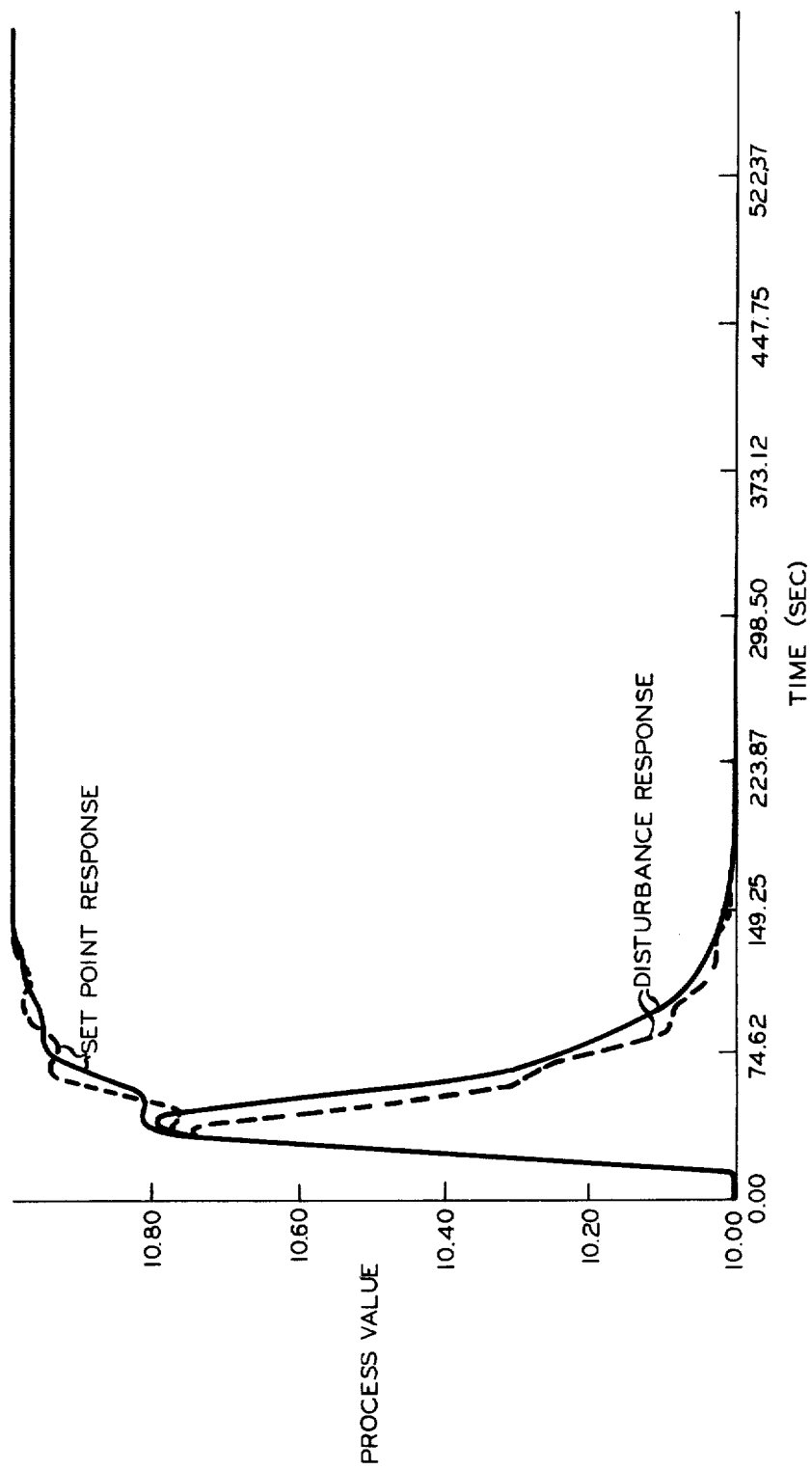

FIG. 6 — model dead-time longer than process dead-time

Figure 7:
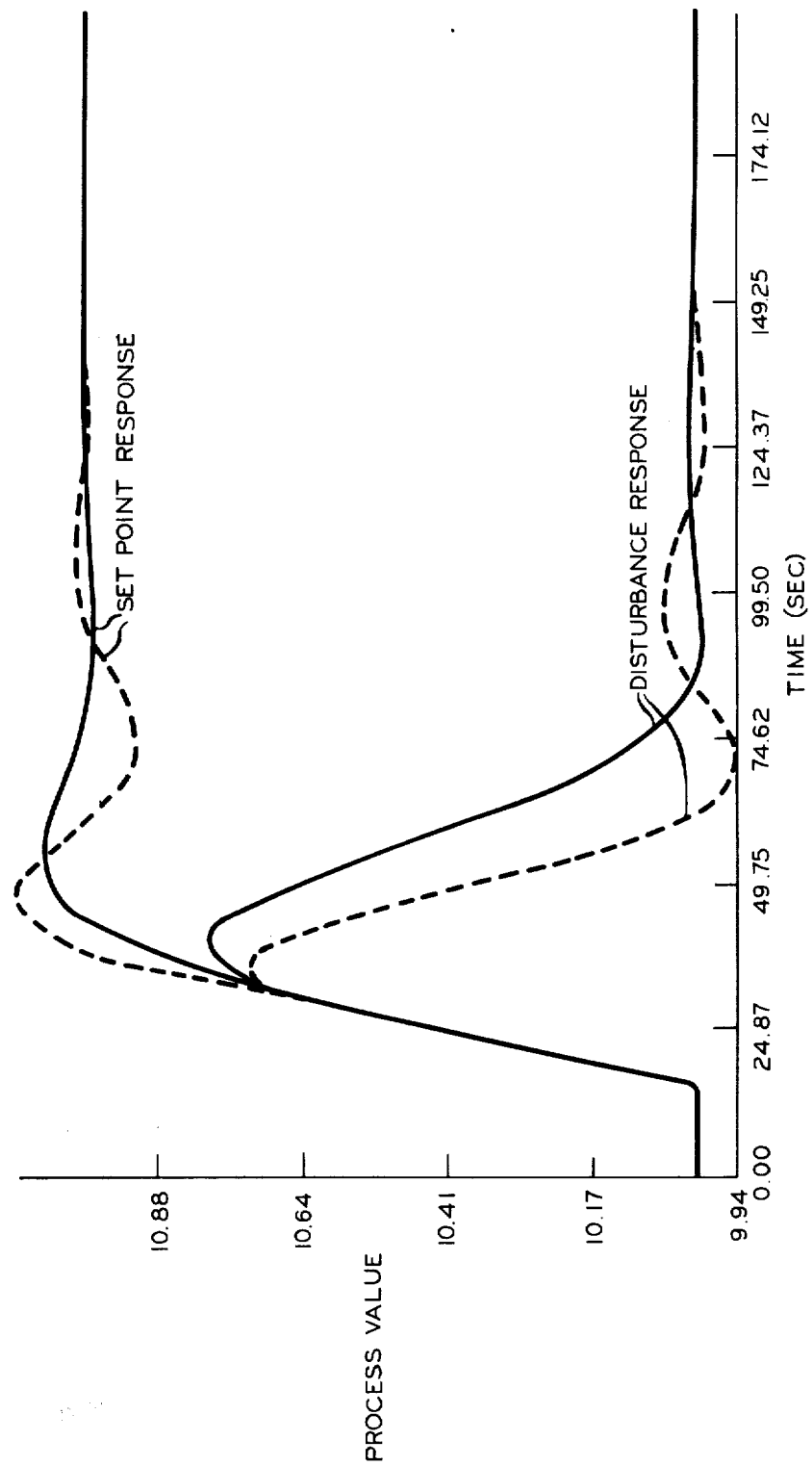

FIG. 7 — model dead-time shorter than process dead-time

Figure 8:
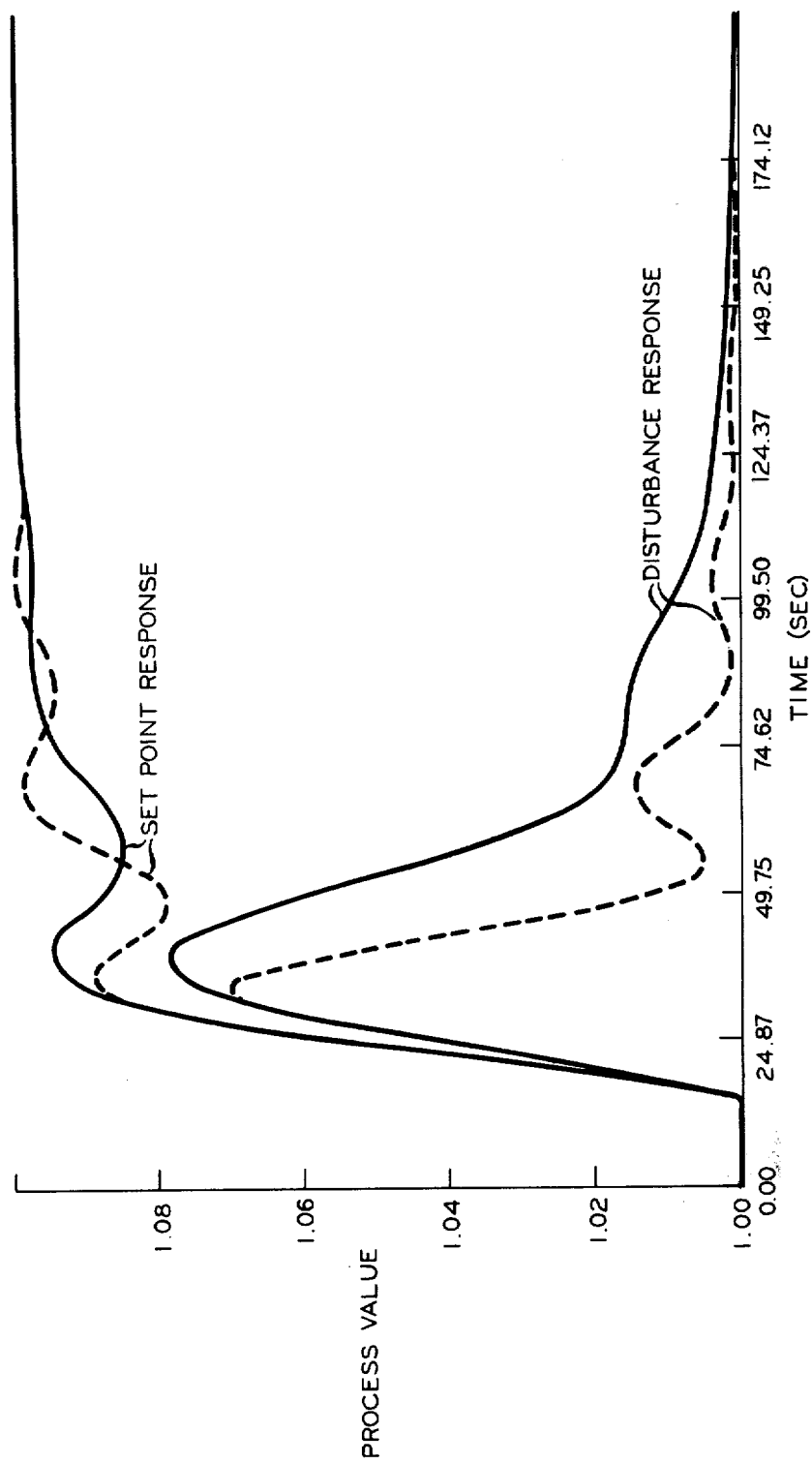

FIG. 8 — model time constants longer than process time constants

Figure 9:
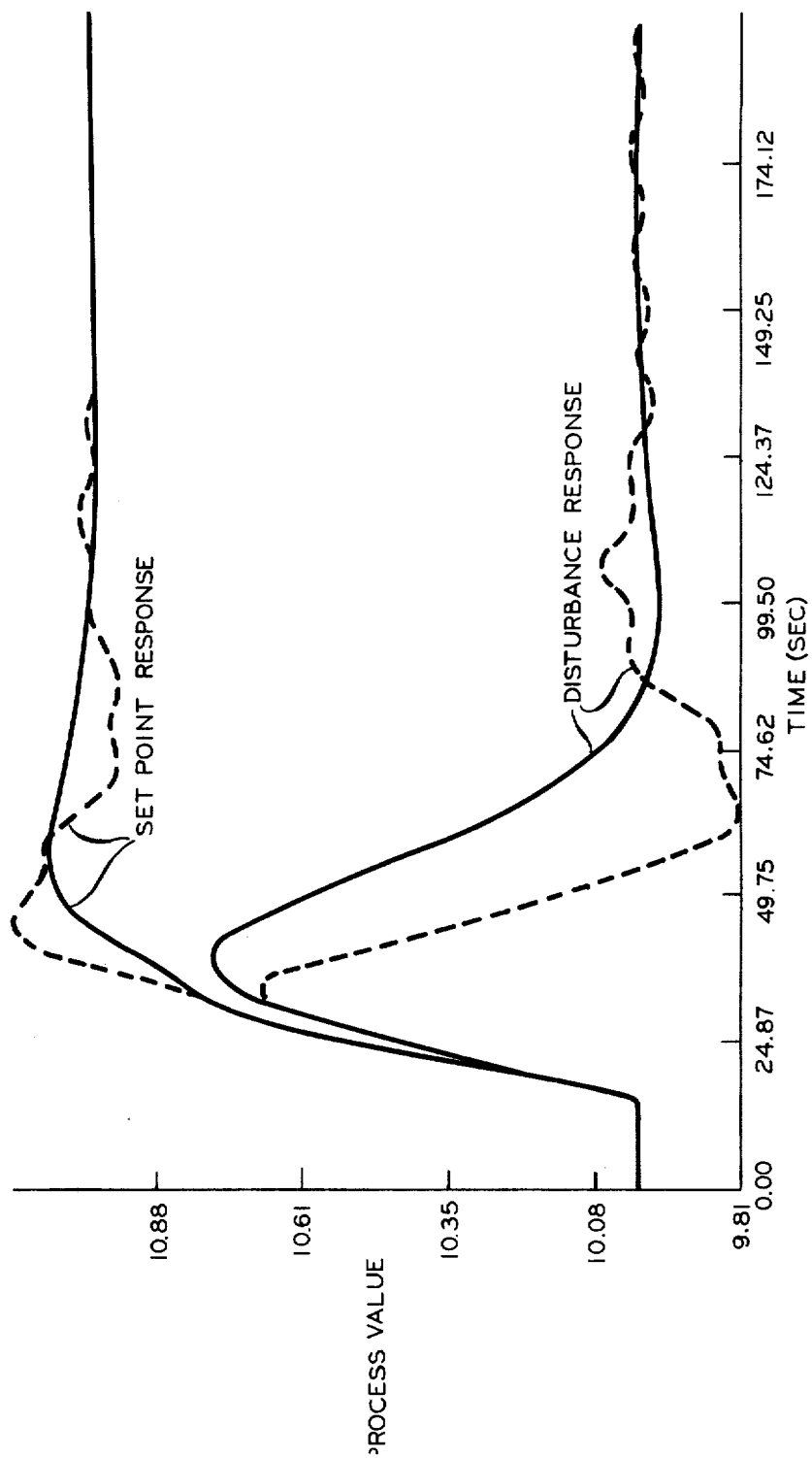

FIG. 9 — model time constants shorter than process time constants and

Figure 10:
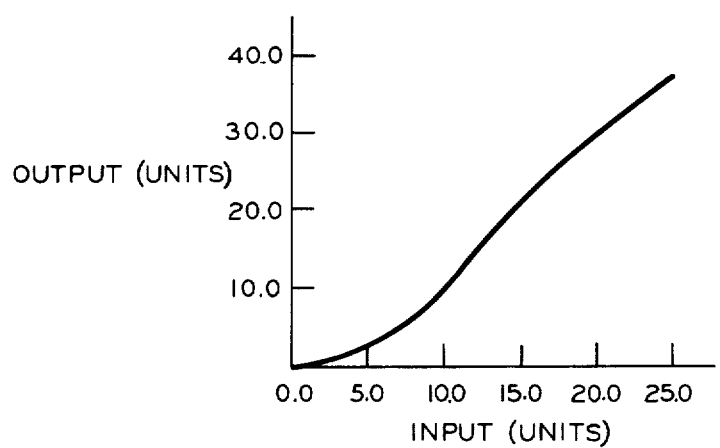
Figure 11:
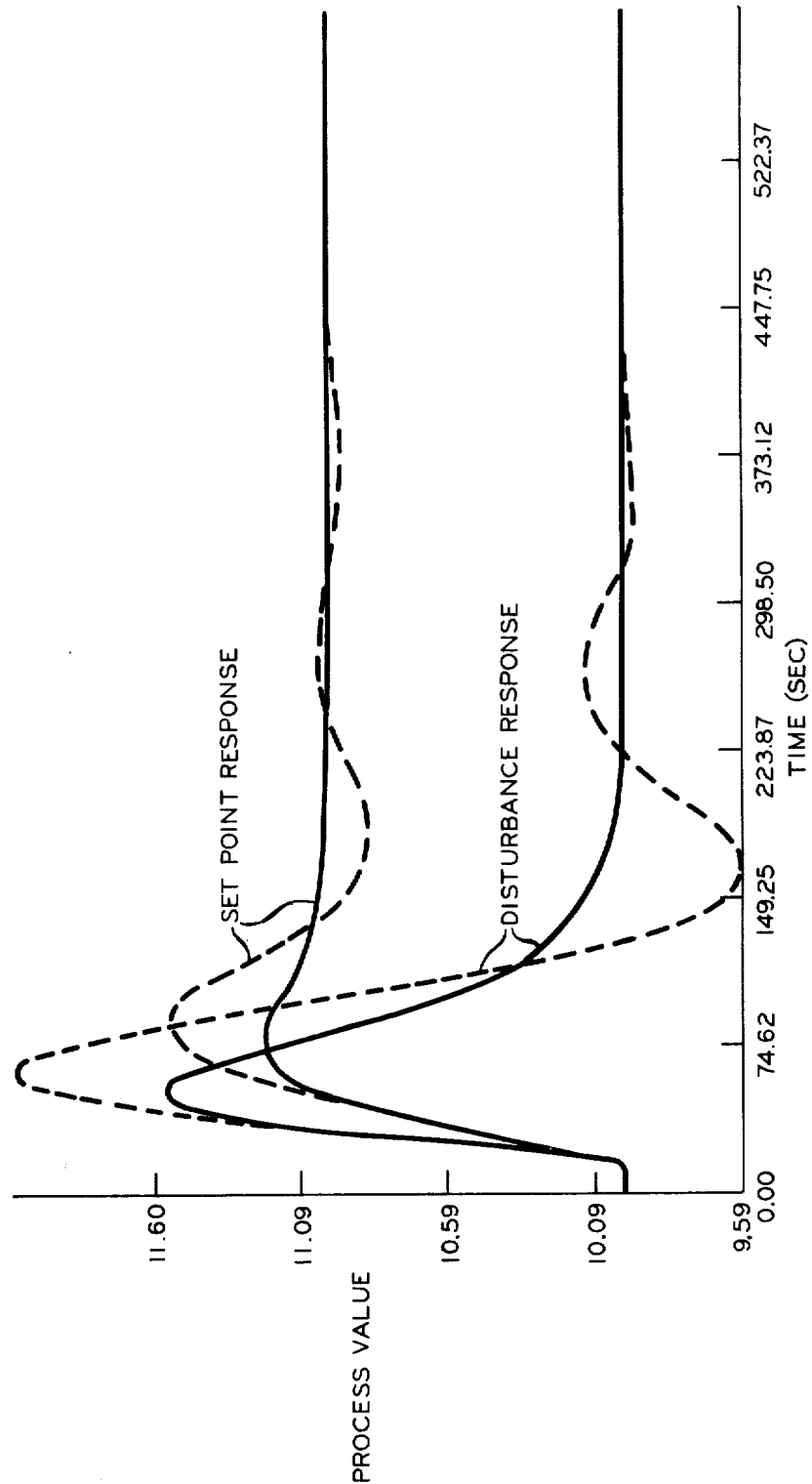

FIG. 11 — non-linear process gain with linear model gain. The gain-adaptive system responses of the invention are illustrated by solid lines, and the Smith predictor responses are illustrated by interrupted lines. The non-linear process gain of the example of FIG. 11 was the pH-type curve illustrated by FIG. 10. The initial steady-state operating point for the process of such example was a process value of 10.0 units. Each example considered both unit setpoint and unit disturbance responses, both having a value of +1, and the quality of control was measured by inspection of time responses and calculation of the integral squared error (ISE), integral time squared error (ITSE) and integral time absolute error (ITAE) using standard error criteria calculations such as those set forth in U.S. Air Force Technical Report ASD-TR61-501.

The controller algorithm was chosen to be proportional-plus-integral and in all examples, except the example illustrated by FIGS. 10–11, the controller settings were determined from the tuning procedure described by Dahlin, E. B., "Designing and Tuning Digital Controller," *Instruments and Control Systems*, Vol. 42, No. 6, June, 1968. The control settings used, except for the example illustrated by FIGS. 10 and 11, were identical for both the gain-adaptive and Smith predictor compensation simulations. For the example illustrated by FIGS. 10 and 11, the controller settings were varied from the values given by the tuning procedure (using a model gain of 1.0) to achieve a quality of control as good as seemed feasible. It was also found necessary for the model using the simulation illustrated by FIG. 6 to use a time constant of 10.0 seconds in the gain-adaptive compensation estimator element. This value was one-half the model dead-time for the example of FIG. 6. In all other cases the model dead-time and estimated time constant were the same. The values of the model parameters and the corresponding proportional-integral controller settings are shown in TABLE I.

TABLE I

| | Model Parameters | | | | Controller Parameters | |
|---|---|---|---|---|---|---|
| FIG. | $K_m$ | $T_{md}$(sec) | $T_{m1}$(sec) | $T_{m2}$(sec) | $K_1$ | $K_2$(sec) |
| 3 | 1.0 | 15.0 | 5.0 | 10.0 | 1.10 | 13.5 |
| 4 | 1.5 | 15.0 | 5.0 | 10.0 | 0.75 | 20.3 |
| 5 | 0.5 | 15.0 | 5.0 | 10.0 | 2.20 | 6.8 |
| 6 | 1.0 | 20.0 | 5.0 | 10.0 | 0.80 | 18.0 |
| 7 | 1.0 | 10.0 | 5.0 | 10.0 | 0.80 | 18.0 |
| 8 | 1.0 | 15.0 | 6.25 | 12.5 | 0.90 | 16.9 |
| 9 | 1.0 | 15.0 | 3.75 | 7.5 | 1.50 | 10.0 |
| 11 | 1.0 | 15.0 | 5.0 | 10.0 | 0.5 | 100.0* |
| | 1.0 | 15.0 | 5.0 | 10.0 | 1.50 | 100.0+ |

*Gain Adaptive
+Smith Predictor

The values of the error criteria corresponding to the results set forth graphically by FIGS. 3–9 and 11 are tabulated in Table II.

TABLE II

| | Set Point Response Gain-Adapt./Smith Pred. | | | Disturbance Response Gain-Adapt./Smith Pred. | | |
|---|---|---|---|---|---|---|
| FIG. | ISE | ITSE | ITAE | ISE | ITSE | ITAE |
| 3 | 22 | 264 | 483 | 7 | 255 | 557 |
| | 22 | 264 | 483 | 15 | 1351 | 630 |
| | 48 | 1207 | 1752 | 7 | 435 | 1460 |
| 4 | 135 | 5924 | 6086 | 16 | 871 | 2251 |
| | 272 | 13233 | 8203 | 240 | 11323 | 6298 |
| 5 | 4697 | ∞ | ∞ | 3964 | ∞ | ∞ |
| | 25 | 345 | 849 | 14 | 588 | 1593 |
| 6 | 24 | 338 | 864 | 18 | 839 | 1997 |
| | 24 | 310 | 656 | 10 | 389 | 936 |
| 7 | 24 | 308 | 554 | 16 | 699 | 1293 |
| | 23 | 297 | 703 | 8 | 276 | 808 |
| 8 | 23 | 290 | 749 | 15 | 668 | 1709 |
| | 23 | 277 | 618 | 8 | 302 | 1001 |
| 9 | 23 | 271 | 530 | 15 | 623 | 1251 |
| | 30 | 625 | 2127 | 115 | 7050 | 7665 |
| 10 | 37 | 1401 | 5109 | 67 | 5195 | 19216 |

In general, the gain-adaptive control system of the invention provided significantly better disturbance response than did the Smith precontrol system. The setpoint responses for the majority of the examples tended to have error values which were lower for the gain-adaptive system or were about the same for both systems. A particular advantage in use of the gain-adaptive control system of the invention is illustrated by FIGS. 4 and 5 where the modeling errors occur in the value of the gain. The advantage of the gain-adaptive control system of the invention is also particularly well illustrated by the response of FIG. 11 wherein the process gain was non-linear.

Overall, the time response curves from the various examples indicate that the process response using the gain-adaptive approach of the invention is generally more orderly than with the Smith predictor. This is particularly true for the responses illustrated by FIGS. 4, 5 and 8, all of which involve gain modeling inaccuracies. While some gain-adaptive responses have a slight tendency to exhibit minor oscillation, they generally exhibit less overshoot and shorter settling times than comparable Smith prediction systems. These qualities are particularly desirable for use with processes wherein orderly transition from one operating condition to another and/or orderly response to a disturbance is desired for stable process operation or where substantial process oscillation cannot be tolerated.

A problem was encountered in attempting to employ the gain-adaptive scheme illustrated by FIG. 6 in which the model dead-time was longer than the process dead-time. Due to an overly oscillatory response, it became necessary to alter the estimator time constant to a value of 10 seconds. This change was not necessary when the model dead-time was too short (FIG. 7). It is, therefore, considered preferable to use a model delay means selected to simulate a dead-time which is slightly less than the actual model dead-time rather than simulate a dead-time which is slightly too long in those cases where the actual dead-time cannot be accurately or consistently modeled.

The Fortran program listing for the main program and subroutines used to simulate the gain-adaptive and Smith predictor control systems is appended hereto as Appendix A. The same programming principles used to produce the computer simulation of an operating system can also be used to implement control of an operating process in accordance with the invention. The subroutines of Appendix A have the following functions:

subroutine SU — set-up, read in data, set constants, etc.
subroutine IT — system initialization
subroutine PR — simulation of process dynamics
subroutine MD — implementation of model dynamics
subroutine GA — gain-adaptor and Smith predictor subroutine
subroutine C — controller implementation
subroutine PT — printing tabulated data
subroutine LNPLT — plotting data graph with a line printer
subroutine XYPLT — plotting data graph with an X—Y printer The method and apparatus of the invention can be implemented in any of the various formats suitable for use in the construction of a process control system including electrical analog, digital electronic, pneumatic, mechanical, hydraulic, and other similar control system formats, as well as combinations of these and other means of control system implementation. Digital electronic implementations utilizing a programmed digital computer and electrical analog implementations are presently preferred.

While the invention has been described herein in conjunction with the presently preferred embodiments thereof, reasonable variations and modifications by those skilled in the art are possible within the scope of the invention and of the appended claims thereto.

We claim:

1. A method of controlling a process, said method comprising:
   generating a process control signal in response to a comparison of a controller variable input signal and a controller setpoint signal;
   applying said process control signal to said process to effect control thereof;
   generating, in response to said process control signal, a process prediction signal representative of the predicted response of a measured process variable to said process control signal;
   applying a delay factor, modeled after the response delay of said process, to said process prediction signal to produce a delayed prediction signal;
   generating a process measurement signal representative of the value of said measured process variable;
   generating in response to said process measurement signal and said delayed prediction signal, a correction signal responsive to the ratio of said measured process variable to the delayed process response prediction; and
   generating said controller variable input signal in response to the product of said process prediction signal and said correction signal.

2. A method in accordance with claim 1 wherein generating said correction signal comprises dividing said process measurement signal by said delayed prediction signal.

3. A method in accordance with claim 2 wherein said correction signal is representative of the ratio of said process measurement signal to said delayed prediction signal.

4. A method in accordance with claim 1 wherein generating said correction signal comprises:
dividing said process measurement signal by said delayed prediction signal to produce an interim ratio signal; and
applying an estimation factor to said interim ratio signal to produce said correction signal.

5. A method in accordance with claim 4 wherein said correction signal is limited to a preselected range of signal values.

6. A method in accordance with claim 4 wherein said delay factor is of the general form $$e^{-T_{md}S}$$

and wherein said estimation factor is of the general form $$1 + T_{dl}S$$

wherein $e$ is the natural or Napierian logarithm base, 2.71828..., and where $T_{md}$ and $T_{dl}$ are $S$ domain time constants.

7. A method in accordance with claim 4 wherein applying said estimation factor comprises applying to said interim ratio signal a lead-compensation factor having a time constant substantially the same as the time constant of said delay factor.

8. A method in accordance with claim 7 wherein said delay factor is of the general form $$e^{-T_{md}S}$$

and wherein said estimation factor is of the general form $$1 + T_{dl}S$$

where $e$ is the natural or Napierian logarithm base, 2.71828..., and where $T_{md}$ and $T_{dl}$ are substantially equal $S$ domain time constants.

9. A method in accordance with claim 8 wherein the $S$ domain transfer function of said process can be suitably approximated by the general form $$\frac{K_p e^{-T_d S}}{(T_{p1}S + 1)(T_{p2}S + 1)}$$

where $e$ is the natural or Napierian logarithm base, 2.71828..., $K_p$ is a constant, $T_d$ is the process $S$ domain lag time constant, and $T_{p1}$ and $T_{p2}$ are process $S$ domain gain time constants.

10. A method in accordance with claim 9 wherein said process control signal is of the general form $$K_1(SP - V) + K_2 \int (SP - V)dt$$

where $SP$ is said setpoint signal, $V$ is said variable input signal, $t$ is time, and $K_1$ and $K_2$ are constants.

11. Apparatus for controlling a process, said apparatus comprising:
process controller means for generating a process control signal in response to a comparison of a controller variable input signal and a controller setpoint signal;
means for providing a process measurement signal representative of the value of a preselected process variable;
process model means comprising model predictor means for simulating the process gain relationship between said process control signal and said measured process variable signal and delivering a process prediction signal responsive to said process control signal and comprising model delay means for applying a model delay factor to said process prediction signal to produce a delayed prediction signal;
means for generating, in response to said process measurement signal and said delayed prediction signal, a correction signal responsive to the ratio of said process measurement signal to said delayed prediction signal;
means for multiplying said process prediction signal by said correction signal to generate said controller variable input signal.

12. Apparatus in accordance with claim 11 wherein said process controller means is adapted to generate a process control signal of the general form $$K_1(SP - V) + K_2 \int (SP - V)dt$$

where $SP$ is said setpoint signal, $V$ is said variable input signal, $t$ is time, and $K_1$ and $K_2$ are constants.

13. Apparatus in accordance with claim 11 wherein said means for generating said correction signal comprises means for dividing said process measurement signal by said delayed prediction signal.

14. Apparatus in accordance with claim 11 wherein said means for generating said correction signal comprises:
means for dividing said process measurement signal by said delayed prediction signal to produce an interim ratio signal; and
estimator means for applying a lead estimation factor to said interim ratio signal to generate said correction signal.

15. Apparatus in accordance with claim 14 additionally comprising limiter means for maintaining said correction signal within a preselected signal range.

16. Apparatus in accordance with claim 14 wherein said delay factor is of the general form $$e^{-T_{md}S}$$

and wherein said estimation factor is of the general form $$1 + T_{dl}S$$

where $e$ is the natural or Napierian logarithm base, 2.71828..., and where $T_{md}$ and $T_{dl}$ are $S$ domain time constants.

17. Apparatus in accordance with claim 14 wherein the lead time constant of the estimation factor applied by said estimator means is substantially the same as the lag time constant of the delay factor applied by said model delay means.

18. Apparatus in accordance with claim 17 wherein said delay factor is of the general formula $$e^{-T_{md}S}$$

and wherein said estimation factor is of the general form $$1 + T_{dl}S$$

where $e$ is the natural or Napierian logarithm base, 2.71828..., and where $T_{md}$ and $T_{dl}$ are substantially equal $S$ domain time constants.

* * * * *